US008548797B2

(12) United States Patent
Kim et al.

(10) Patent No.: US 8,548,797 B2
(45) Date of Patent: Oct. 1, 2013

(54) SHORT TEXT LANGUAGE DETECTION USING GEOGRAPHIC INFORMATION

(75) Inventors: Yookyung Kim, Los Altos, CA (US); Shuang Guo, San Jose, CA (US); Xian Xiang Hu, San Jose, CA (US); Xin Li, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1134 days.

(21) Appl. No.: 12/262,145

(22) Filed: Oct. 30, 2008

(65) Prior Publication Data

US 2010/0114559 A1 May 6, 2010

(51) Int. Cl.
G06F 17/20 (2006.01)
G06F 17/28 (2006.01)
G06F 17/27 (2006.01)
G06F 17/21 (2006.01)
G10L 21/00 (2013.01)

(52) U.S. Cl.
USPC ............ 704/8; 704/1; 704/3; 704/4; 704/9; 704/10; 704/270; 704/270.1; 704/275

(58) Field of Classification Search
USPC ............. 704/1, 3, 4, 8, 9, 270, 270.1, 275, 704/10
See application file for complete search history.

(56) References Cited

U.S. PATENT DOCUMENTS

| 5,796,952 A * | 8/1998 | Davis et al. ................. 709/224 |
| 5,937,422 A * | 8/1999 | Nelson et al. ................ 715/206 |
| 7,386,438 B1 * | 6/2008 | Franz et al. ...................... 704/8 |
| 7,412,374 B1 * | 8/2008 | Seiler et al. ..................... 704/8 |
| 7,685,083 B2 * | 3/2010 | Fairweather .................... 706/45 |
| 7,908,260 B1 * | 3/2011 | Bushee ........................ 707/705 |
| 7,937,336 B1 * | 5/2011 | Maynard-Zhang et al. .... 706/12 |
| 8,073,860 B2 * | 12/2011 | Venkataraman et al. ..... 707/759 |
| 8,224,994 B1 * | 7/2012 | Schneider ..................... 709/245 |
| 2001/0020225 A1 * | 9/2001 | Zerber ............................ 704/3 |
| 2001/0025320 A1 * | 9/2001 | Seng et al. ................... 709/245 |
| 2003/0110021 A1 * | 6/2003 | Atkin ............................. 704/1 |
| 2004/0044791 A1 * | 3/2004 | Pouzzner ..................... 709/245 |
| 2005/0154746 A1 * | 7/2005 | Liu et al. ...................... 707/101 |
| 2005/0234972 A1 * | 10/2005 | Zeng et al. .............. 707/103 R |
| 2007/0112714 A1 * | 5/2007 | Fairweather ................... 706/46 |

(Continued)

OTHER PUBLICATIONS

ITU, "Technology and Policy Aspects", Multilingual domain names: Joint ITU/WIPO Symposium, Geneva, Dec. 6-7, 2001.*

(Continued)

*Primary Examiner* — Edgar Guerra-Erazo
(74) *Attorney, Agent, or Firm* — Hickman Palermo Truong Becker Bingham Wong LLP

(57) ABSTRACT

A content-providing entity receives a relatively short text from a user and attempts to determine, automatically, based on that short text (and on other available clues), a language that the user can read and understand. The content-providing entity may then provide, to the user, documents that are written in the determined language. The content-providing entity may determine a language of the input text based on several factors in combination: (a) the service provider's "market," which is determined based on at least a portion of the URL of the Internet site to which the user directed his browser; (b) the user's "region," which is determined based on the source Internet Protocol (IP) address of the IP packets that the user sends to the Internet site; (c) the "script" in which the short user-entered text is written; and (d) a statistical analysis of the frequency of the characters present in the short user-entered text.

32 Claims, 5 Drawing Sheets

(56) References Cited

U.S. PATENT DOCUMENTS

| | | | |
|---|---|---|---|
| 2007/0124202 A1* | 5/2007 | Simons | 705/14 |
| 2008/0126077 A1* | 5/2008 | Thorn | 704/8 |
| 2008/0201304 A1* | 8/2008 | Sue | 707/3 |
| 2008/0281577 A1* | 11/2008 | Suzuki | 704/2 |
| 2010/0036912 A1* | 2/2010 | Rao | 709/204 |
| 2010/0088086 A1* | 4/2010 | Hughes et al. | 704/8 |
| 2010/0169074 A1* | 7/2010 | Hung et al. | 704/8 |

OTHER PUBLICATIONS

Kikui et al., "Cross-lingual Information Retrieval on the WWW", Multilinguality in Software Engineering: AI Contribution (in conjunction with ECAI 96). 1996. lap. 1-6.*

Hu et al., "Improving Query Transiation for Cross-Language Infromation Retrieval using a Web-based Aooroach", 2004. 8 pages.*

* cited by examiner

SHORT TEXT LANGUAGE DETECTION USING GEOGRAPHIC INFORMATION

FIELD OF THE INVENTION

The present invention relates to techniques for automatically determining a language of user input text that is relatively short in length, based on the textual information of the input text and the geographic information of the user and the service provider, so that a document written in that language can be served to that user without asking the user.

BACKGROUND

Multinational companies do business with people all over the world. A multinational company's customers come from a variety of different countries. These customers read, write, and speak a variety of different languages. In order to satisfy customers from all over the world, multinational companies are interested in delivering, to their customers, content written in the languages that those customers can understand.

For example, a newspaper publisher might have subscribers from many different countries, and subscribers from different countries may speak different languages. The newspaper publisher might be capable of producing editions of a newspaper (or a digital version thereof) in several different languages. Different language editions of a newspaper might actually have different content (i.e., not just merely a translation of the same content from a different language edition) that is estimated to be of interest to those who read various different languages. In order to serve the correct language edition of the newspaper to a particular subscriber, the newspaper publisher wants to know which languages the particular subscriber can read.

For another example, an Internet search engine provider, such as Yahoo! Inc., might provide several portal web pages that contain text entry fields into which users from around the world can submit query terms. Users who submit query terms to the search engine via the text entry fields are interested in seeing search results that are relevant to the submitted query terms. More specifically, such users are interested in seeing search results that are not only relevant to the query terms, but are also written in languages that those users can read and have in mind when entering the particular query terms. Search results may come from locations all over the world, and the documents to which those search results refer may be written in various different languages. Users of a search engine are sure to be disappointed if the majority of the search results that those users receive from that search engine are written in languages that those users do not understand, even if the search results were highly relevant to the query terms that the users submitted.

Unfortunately, the task of estimating the language that is useful for a particular user for a particular case, under many circumstances, not a trivial task. Often, the only information that is known about a particular user is limited to relatively short text that the user has provided. For example, under some circumstances, the only information that an Internet search engine has regarding a user is the relatively short string of query terms that the user has entered into the text entry field of the Internet search engine's portal page. The intended language of the same query may be different depending on the user. For the same query, German documents may be more useful or French documents may be more useful depending on the user's intent.

An Internet search engine or other content-providing entity could conceivably ask its users, expressly, in which languages those users want to get the content service. However, if a user is asked, in a language that the user does not understand, the question about which languages the user speaks, then the user will not be able to answer the question. Asking this question in every possible language is somewhat impractical and lacks finesse. Additionally, unless the content-providing entity wants to ask the entity's users this question repeatedly (which can irritate the users) over multiple interactions with those users, the content-providing entity will need to store the answer to this question, and associate each user's answer with that user, usually by requiring the user to create a registered account with the entity. Some busy users are reluctant to take the time to create a registered account, and other users, fearful of identity theft, are hesitant to provide any personal information to a content-providing entity. Thus, asking users to indicate, expressly, which languages those users are capable of reading is not always a feasible solution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

Figure 1A:
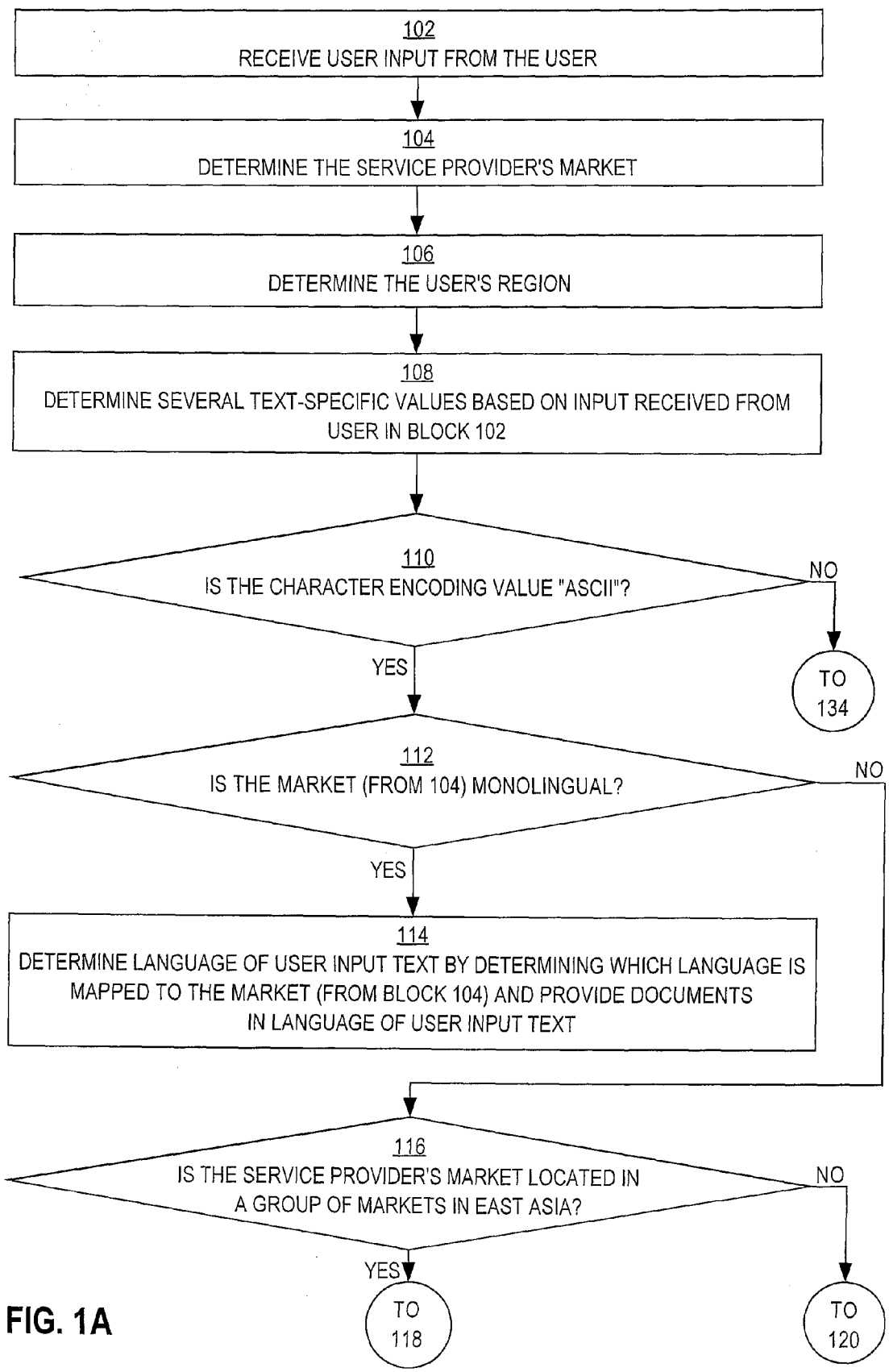
FIGS. 1A-D are a flow diagrams that illustrate a computer-implemented technique for automatically determining the language intended by a user who has directed his Internet browser to a web site on the Internet, according to an embodiment of the invention.
Figure 1B:
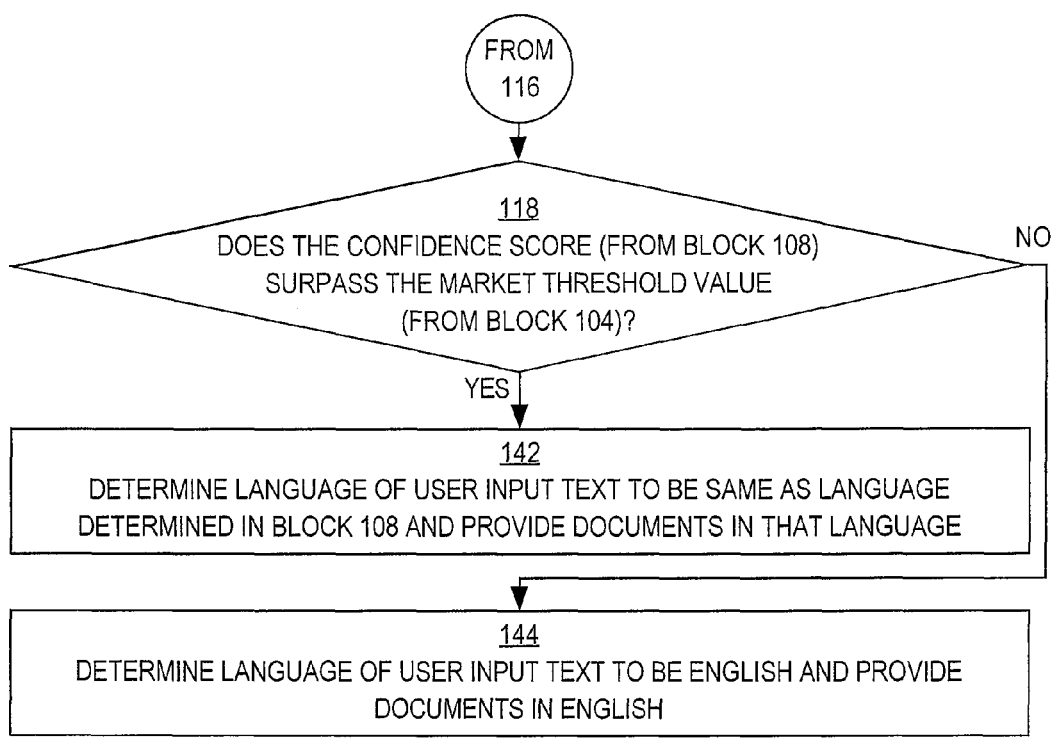
Figure 1C:
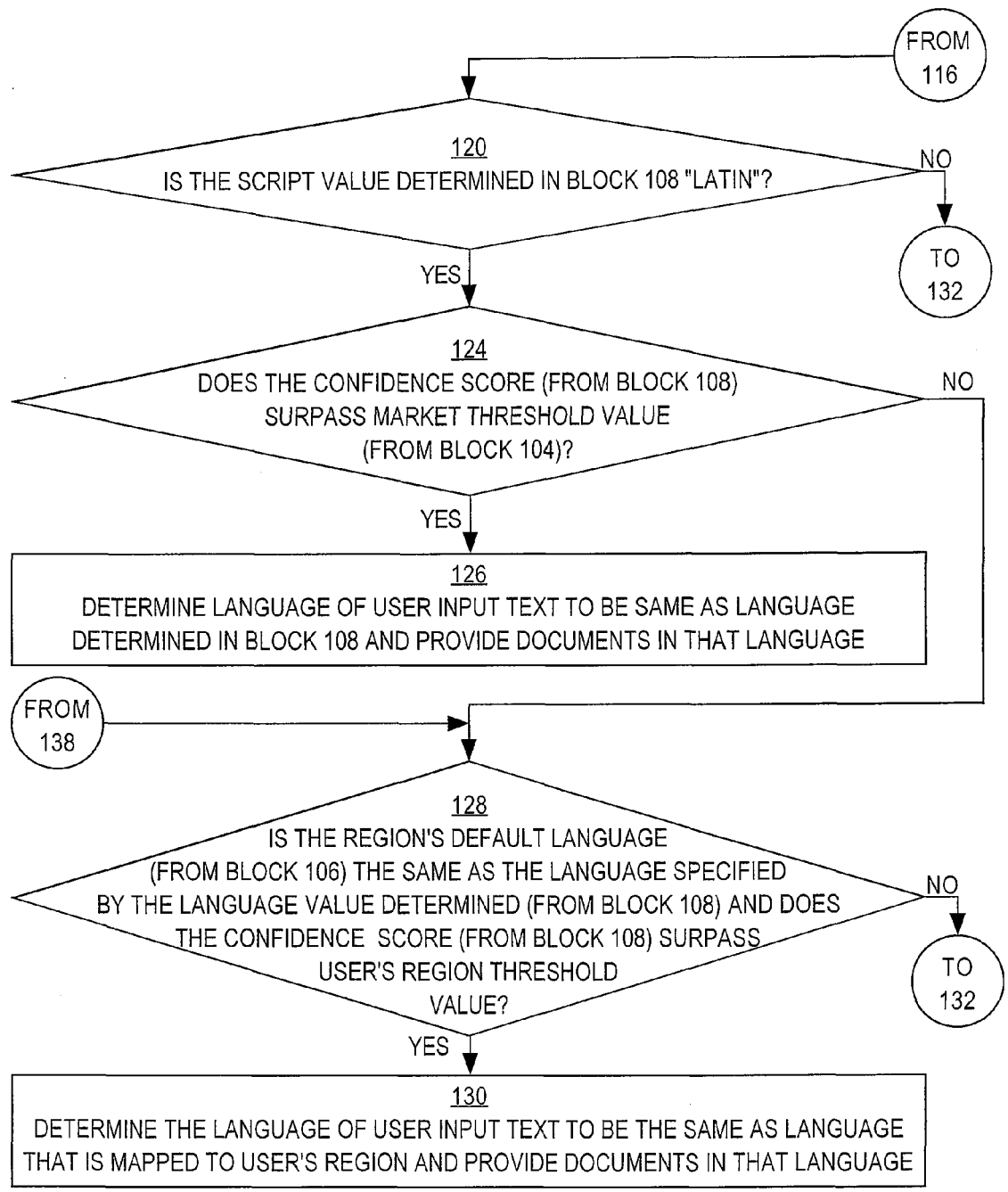
Figure 1D:
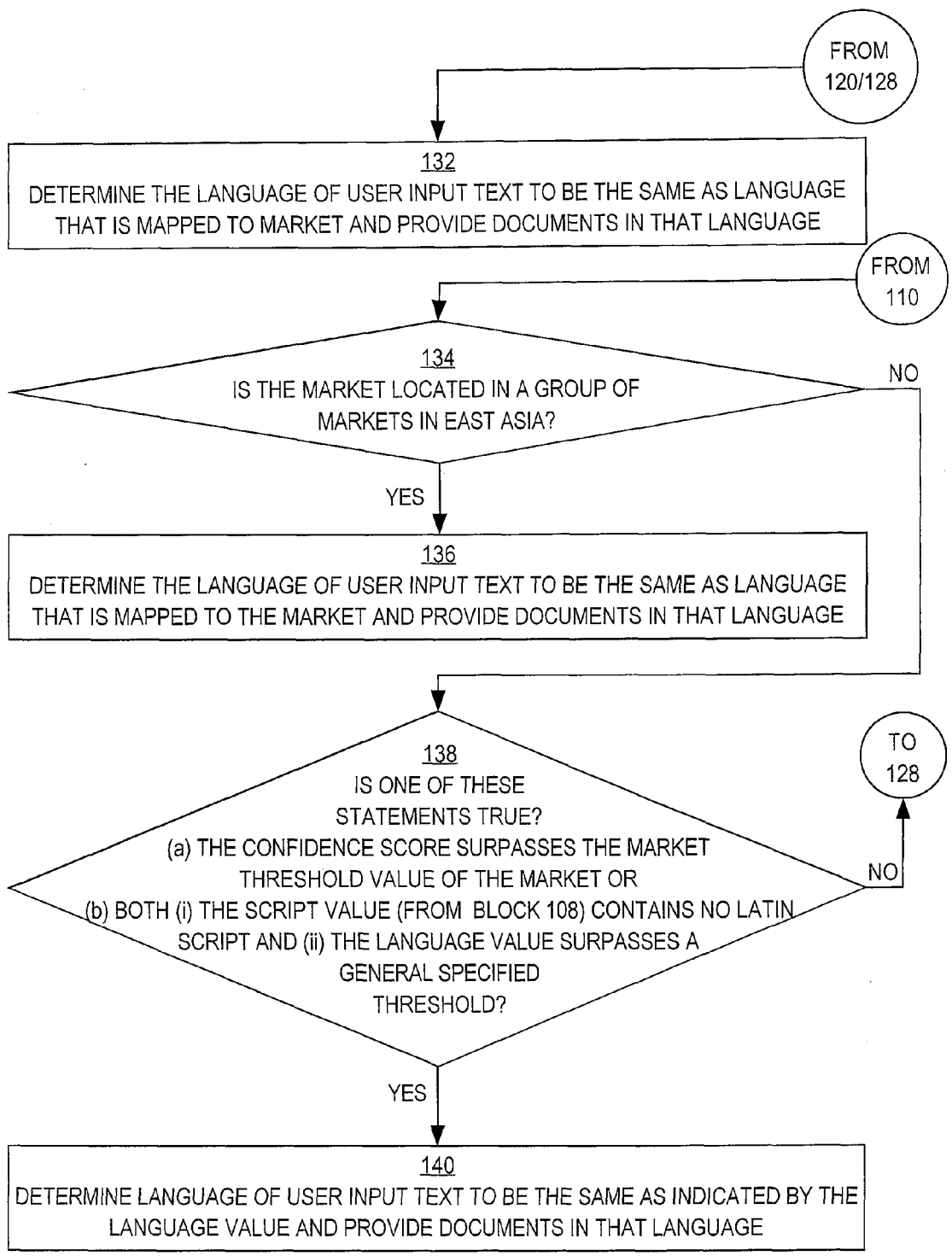

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, a content-providing entity (such as an Internet search engine) receives a relatively short text (such as a string of query terms) from a user and attempts to determine, automatically, based at least in part on that short text (and, potentially, on other available clues), a language that is intended by the user. The content-providing entity may then provide, to the user, documents that are written in the determined language.

In one embodiment of the invention, a content-providing entity determines the language of a text that a user inputs based on several factors in combination: (a) the service provider's "market," which is determined based on at least a portion of the Uniform Resource Locator (URL) of the Internet site to which the user directed his browser; (b) the user's "region," which is determined based at least in part on the source Internet Protocol (IP) address of the IP packets that the user sends to the Internet site; (c) the "script" in which the short user-entered text is written; and (d) a statistical analysis of the frequency of the characters present in the short user-entered text.

For each factor, techniques described herein generate a corresponding confidence score that indicates how reliable that factor is in predicting the language of the input text. In determining the language of the input text, techniques described herein give more weight and influence to factors with higher confidence scores than to factors with lower confidence scores. Certain techniques described herein refrain, on a case-by-case basis, from using factors that are associated with confidence scores that fall below a specified threshold.

Example Technique for Determining a Language of the Input Text

FIGS. 1A-D are flow diagrams that illustrates a computer-implemented technique for automatically determining the language that would be intended by a user who has directed his Internet browser to a web site on the Internet. Alternative embodiments of the invention may involve more, fewer, or different steps than those illustrated in FIGS. 1A-D.

In block 102, the web site receives user input from the user. For example, the web site may be the portal page of an Internet search engine, and the user input may include one or more query terms. Typically, the size of the user input will be relatively small (e.g., 20 bytes or less). Using conventional statistical analysis on such a small text typically will not determine the text's language with a high degree of confidence, because there are so few characters to analyze.

In block 104, a computer-implemented process executing on the web site's server determines the service provider's "market", i.e., the regional business unit of the service provider. According to one embodiment of the invention, the service provider's "market" is a data item whose value depends on the URL of the web site to which the user directed his Internet browser application. More specifically, in one embodiment of the invention, the top-level domain of the URL determines the service provider's market. In one embodiment of the invention, the computer-implemented process searches for the top-level domain in a computer-stored list of top-level domains that are mapped to specified markets. The top-level domain of a URL is the part of the URL that follows the last period character (".") in the domain name, which is the part of the URL that immediately follows the double-slash ("//") and precedes the first single slash ("/") in the URL. For example, in the domain name "www.yahoo.com," the top-level domain is "com."

If the top-level domain is found in the list, and if the top-level domain is mapped to a particular market, then the computer-implemented process determines the service provider's market to be the particular market. For example, if the top-level domain is "com," and if the "com" top-level domain is mapped to the "United States" market in the stored list, then the computer-implemented process determines the service provider's market to be the "United States" market. For another example, if the top-level domain is "jp," and if the "jp" top-level domain is mapped to the Japan market, then the computer-implemented process determines the service provider's market to be the "Japan" market, and the market can map to a group market such as "East Asia" market group.

Alternatively, if the top-level domain is not found in the list, or if the top-level domain is not mapped to any market in the list, then the computer-implemented process determines the service provider's market to be the "United States" market by default. Markets may correspond to political entities, such as nations, but markets do not necessarily need to correspond to such political entities. Some nations are not associated with any market, and some markets may correspond to entities other than nations.

In block 106, a computer-implemented process executing on the web site's server determines the user's "region." According to one embodiment of the invention, the user's "region" is a data item whose value depends on the source IP address of the IP packets that the user's Internet browser has sent to the web site's server (e.g., the IP packets that encapsulated the Hypertext Transfer Protocol (HTTP) request for the web site's portal page). In one embodiment of the invention, the computer-implemented process searches for an IP subnet to which the source IP address belongs in a computer-stored list of IP subnets that are mapped to specified countries (i.e., nations) or regions which are identifiable as a socio cultural unit with a major language associated, such as Quebec area of Canada. Depending on the content providing entity, the user can be either an agent sending a text or an agent receiving a text, or both. There is only one user who inputs a query text for a search portal, whereas email involves two users: a sender and a receiver. In the latter case, regions of both users will be considered as user's regions.

If an IP subnet to which the source IP address belongs is found in the list, and if the IP subnet is mapped to a particular region, then the computer-implemented process determines the user's region to be the particular region. Alternatively, if no IP subnet to which the source IP address belongs is found in the list, or if the only IP subnets to which the source IP address belongs are not mapped to any region in the list (as might be the case with IP subnets in Hong Kong, for example), then the computer-implemented process determines the user's region to be the "United States" by default.

In block 108, a computer-implemented process executing on the web site's server automatically determines several text-specific values based on the user input that the web site received from the user in block 102. In one embodiment of the invention, the text-specific values include: (a) a character encoding value that specifies which character encoding scheme (e.g., American Standard Code for Information Interchange (ASCII), Unicode, etc.) was used to encode the characters of the user input, (b) a language value determined by an automatic statistical textual analysis of the user input, (c) a confidence score that indicates the degree of certainty that the language value actually represents the language in which the user input is written, and (d) a script value that specifies which named sub-range of the Unicode character set the characters of the user input belong, if the characters are encoded in Unicode. Techniques for determining the language value and the confidence score are discussed in greater detail below in the section titled "STATISTICAL TEXTUAL ANALYSIS." As used herein, "Unicode" refers to the standard character set specified by the Unicode Consortium, based in California. Unicode is specified in "The Unicode Standard" (ISBN 0-321-48091-0), which is incorporated by reference as though fully disclosed herein.

In block 110, a computer-implemented process executing on the web site's server determines whether the character encoding value determined in block 108 is "ASCII." If the character encoding value is "ASCII," then control passes to block 112. Otherwise, control passes to block 134.

In the stored list of markets discussed above in connection with block 104, some of the markets are marked as being "monolingual," meaning that a single language is dominant in that market, and some of the markets are market as being "multilingual," meaning that multiple languages, none of them especially dominant, are spoken and written in that market. In block 112, the computer-implemented process determines whether the service provider's market, determined in block 104, is marked as being "monolingual." If the service provider's market is marked as being "monolingual," then control passes to block 114. Otherwise, control passes to block 116.

In block 114, the computer-implemented process determines the language of the user's input text by determining which language is mapped to the service provider's market (determined in block 104) in a stored set of mappings between markets and languages. For example, if the service provider's market is "United Kingdom," and if the "United Kingdom" market is mapped to the "English" language, then the language of the input text is determined to be "English." After determining the language, the web site may provide the user with documents (e.g., web pages) that are written in the user's determined language. For example, if the web site is an Internet search engine, then the web site may provide the user with a list of references to documents that are both relevant to the user-entered query terms (as determined by a relevance ranking algorithm) and written in the user's determined language. Below, TABLE 1 shows an example of possible mappings between market codes and languages that are spoken in the markets to which those market codes correspond.

TABLE 1

EXAMPLE MARKET CODE-TO-LANGUAGE MAPPINGS

| MARKET CODE | LANGUAGE |
|---|---|
| Ar | Spanish |
| At | German |
| Au | English |
| Br | Portuguese |
| Caen | English |
| Cafr | French |
| Ch | German |
| Chfr | French |
| Cl | Spanish |
| Co | Spanish |
| Ct | Catalan |
| De | German |
| Dk | Danish |
| Es | Spanish |
| Fi | Finnish |
| Fr | French |
| Gk | Greek |
| Hk | Traditional Chinese |
| Ide | Bahasa Indonesian |
| In | English |
| Jp | Japanese |
| Kr | Korean |
| Mye | Malay |
| Nl | Dutch |
| No | Norwegian |
| Pe | Spanish |
| Ph | Tagalog |
| Ru | Russian |
| Se | Swedish |
| Sg | English |
| Th | Thai |
| Tw | Traditional Chinese |
| Uk | English |
| Us | English |
| Ve | Spanish |
| Vn | Vietnamese |

Alternatively, in block 116, the computer-implemented process determines whether the service provider's market is located in a group of markets that are known to be in East Asia. In one embodiment of the invention, if the top-level domain of the URL discussed above in connection with block 104 is any of "cn" (China), "tw" (Taiwan), "jp" (Japan), "kr" (Korea), or "hk" (Hong Kong), then the service provider's market is identified as being in the "East Asia" group of markets. If the service provider's market is in the "East Asia" group of markets, then control passes to block 118. Otherwise, control passes to block 120.

In block 118, the computer-implemented process determines whether the confidence score from block 108 surpasses the service provider's market threshold. If the confidence score does surpass the service provider's market threshold, then control passes to block 142. These markets have two default languages, one for each market, and English for ASCII texts. Otherwise, control passes to block 144. After determining the language of the input text, the web site may provide the user with documents (e.g., web pages) that are written in the determined language, as is discussed above in connection with block 114.

Alternatively, in block 120, the computer-implemented process determines whether the script value determined in block 108 indicates that the script in which the user input (which the web site received from the user in block 102) is written is "Latin." In one embodiment of the invention, the computer-implemented process determines whether the characters in which the user input was written belong to one of the Unicode "Latin" scripts, including "Basic Latin" (including hex codes 0021-007E), "Latin-1" (including hex codes 00A1-00FF), "Latin Extended A" (including hex codes 0100-017F), "Latin Extended B" (including hex codes 0180-024F), "Latin Extended C" (including hex codes 2C60-2C7F), "Latin Extended D" (including hex codes A720-A7FF), and "Latin Extended Additional" (including hex codes 1E00-1EFF). In such an embodiment, if the characters belong to any of these Unicode "Latin" scripts, then the computer-implemented process determines the script of the user's input to be "Latin." In an alternative embodiment of the invention, the computer-implemented process determines the script of the user's input to be "Latin" only if the characters of the user input belong to the Unicode "Basic Latin" character set. In either embodiment, if the script value is "Latin," then control passes to block 124. Otherwise, control passes to block 132.

According to one embodiment of the invention, the stored list of markets discussed above in connection with block 104 additionally specifies mappings between markets and specified one or more threshold values for those markets. Each market may be mapped to a different threshold value. In block 124, the computer-implemented process determines whether the confidence score (determined in block 108) surpasses a market threshold value that is mapped to the service provider's market (determined in block 104). If the confidence score surpasses the specified threshold value, then control passes to block 126. Otherwise, control passes to block 128.

In block 126, the computer-implemented process determines the language of the input text to be the language that is indicated by the language value (determined in block 108 using statistical textual analysis of the user input). After determining the language of the input text, the web site may provide the user with documents (e.g., web pages) that are written in the user's determined language, as is discussed above in connection with block 114. In one embodiment of the invention, a stored list of regions (which may be mapped to IP subnets, as discussed above in connection with block 106) specifies mappings between each region and a specified default language for that region. In block 128, the computer-implemented process determines whether a default language mapped to the user's region (determined in block 106) is the same language that is specified by the language value (determined in block 108) with a confidence score which surpasses a threshold. Below, TABLE 2 shows an example of possible mappings between regions and default languages that are spoken in those regions. If the default language mapped to the user's region is the same as the language value determined based on statistical textual analysis of the user input, then control passes to block 130. Otherwise, control passes to block 132.

TABLE 2

EXAMPLE REGION-TO-LANGUAGE MAPPINGS

| REGION | LANGUAGE |
|---|---|
| Afghanistan | Pashto |
| Aland Islands | Finnish |
| Algeria | Arabic |
| American Samoa | English |
| Andorra | Catalan |
| Angola | Kuanyama |
| Anguila | English |
| Antarctica | English |
| Antigua and Barbuda | English |
| Argentina | Spanish |
| Armenia | Armenian |
| Aruba | Dutch |
| Australia | English |
| Austria | German |
| Azerbaizan | Russian |
| Bahamas | English |
| Bahrain | Arabic |
| Bangladesh | Bengali |
| Barbados | English |
| Belarus | Belarusian |
| Belgium | Dutch |
| Belize | English |
| Benin | French |
| Bermuda | English |
| Bhutan | Dzongkha |
| Bolivia | Spanish |
| Bosnia and Herzegovina | Bosnian |
| Botswana | Tswana |
| Bouvet Island | English |
| Brazil | Portuguese |
| British Indian Ocean Territory | English |
| British Virgin Islands | English |
| Brunei | Malay |
| Bulgaria | Bulgarian |
| Burkina Faso | French |
| Burundi | Rundi |
| Cambodia | Central Khmer |
| Cameron | English |
| Canada | English |
| Canada/QC | French |
| Cape Verde Islands | Portuguese |
| Cayman Islands | English |
| Central African Republic | French |
| Chad | French |
| Chile | Spanish |
| China | Simplified Chinese |
| Christmas Island | English |
| Cocos (Keeling) Islands | English |
| Colombia | Spanish |
| Comoros | Arabic |
| Congo | French |
| Cook Islands | English |
| Costa Rica | Spanish |
| Cote d'Ivoire | French |
| Croatia | Croatian |
| Cuba | Spanish |
| Cyprus | Greek |
| CzechRepublic | Czech |
| Democratic Republic of the Congo | French |
| Denmark | Danish |
| Djibouti | French |
| Dominica | English |
| Dominican Republic | Spanish |
| East Timor | Portuguese |
| Ecuador | Spanish |
| Egypt | Arabic |

TABLE 2-continued

EXAMPLE REGION-TO-LANGUAGE MAPPINGS

| REGION | LANGUAGE |
|---|---|
| El Salvador | Spanish |
| Equatorial Guinea | Spanish |
| Eritrea | Arabic |
| Estonia | Estonian |
| Ethiopia | Afar |
| Falkland Islands | English |
| Faroe Islands | Danish |
| Fiji | English |
| Finland | Finnish |
| France | French |
| French Guiana | French |
| French Polynesia | French |
| French Southern Territories | French |
| Gabon | French |
| Gambia | English |
| Georgia | Georgian |
| Germany | German |
| Ghana | Akan |
| Gibraltar | English |
| Greece | Greek |
| Greenland | Kalaallisut |
| Grenada | English |
| Guadeloupe | French |
| Guam | Chamorro |
| Guatemala | Spanish |
| Guinea | French |
| Guinea-Bissau | Portuguese |
| Guyana | English |
| Haiti | Haitian |
| Heard and McDonald Islands | English |
| Honduras | Spanish |
| Hong Kong | English |
| Hungary | Hungarian |
| Iceland | Icelandic |
| India | English |
| Indonesia | Bahasa Indonesian |
| Iran | Farsi |
| Iraq | Arabic |
| Ireland | Irish |
| Israel | Hebrew |
| Italy | Italian |
| Jamaica | English |
| Japan | Japanese |
| Jordan | Arabic |
| Kazakhstan | Kazakh |
| Kenya | Kikuyu |
| Kiribati | English |
| Kuwait | Arabic |
| Kyrgyzstan | Kirghiz |
| Laos | Lao |
| Latvia | Latvian |
| Lebanon | Arabic |
| Lesotho | Sotho |
| Liberia | English |
| Liechtenstein | German |
| Lithuania | Lithuanian |
| Luxembourg | Luxembourgish |
| Lybia | Arabic |
| Macau | Traditional Chinese |
| Macedonia | Macedonian |
| Madagascar | Malagasy |
| Malawi | Chichewa |
| Malaysia | Malay |
| Maldives | Divehi |
| Mali | Bambara |
| Malta | Maltese |
| Marshall Islands | English |
| Martinique | French |
| Mauritania | Arabic |
| Mauritius | English |
| Mayotte | French |
| Mexico | Spanish |
| Micronesia | Enlgish |
| Moldova | Moldavian |
| Monaco | French |
| Mongolia | Mongolian |

TABLE 2-continued

EXAMPLE REGION-TO-LANGUAGE MAPPINGS

| REGION | LANGUAGE |
|---|---|
| Montserrat | English |
| Morocco | Arabic |
| Mozambique | Portuguese |
| Myanmar | Burmese |
| Namibia | English |
| Nauru | Nauru |
| Nepal | Nepali |
| Netherlands | Dutch |
| Netherlands Antilles | Dutch |
| New Caledonia | French |
| New Zealand | English |
| Nicaragua | Spanish |
| Niger | French |
| Nigeria | English |
| Niue | English |
| Norfolk Island | English |
| North Korea | Korean |
| Northern Mariana Islands | English |
| Norway | Norwegian |
| Oman | Arabic |
| Pakistan | Urdu |
| Palau | English |
| Panama | Spanish |
| Papua New Guinea | English |
| Paraguay | Spanish |
| Peru | Spanish |
| Philippines | Tagalog |
| Pitcairn | English |
| Poland | Polish |
| Portugal | Portuguese |
| Puerto Rico | Spanish |
| Qatar | Arabic |
| Reunion | French |
| Romania | Romanian |
| Russia | Russian |
| Rwanda | French |
| S. Georgia and S. Sandwich Islands | English |
| Saint Helena | English |
| Saint Kitts and Nevis | English |
| Saint Lucia | English |
| Saint Pierre and Miquelon | French |
| Saint Vincent and the Grenadines | English |
| Samoa | Samoan |
| San Marino | Italian |
| Sao Tome e Principe | French |
| Saudi Arabia | Arabic |
| Senegal | French |
| Serbia and Montenegro | Serbian |
| Seychelles | English |
| Sierra Leone | English |
| Singapore | English |
| Slovakia | Slovak |
| Slovenia | Slovenian |
| Solomon Islands | English |
| Somalia | Somali |
| South Africa | Afrikaans |
| South Korea | Korean |
| Spain | Spanish |
| Spain/Catalonia | Catalan |
| Sri Lanka | Sinhala |
| Sudan | Arabic |
| Suriname | Dutch |
| Svalbard and Jan Mayen Islands | Norwegian |
| Swaziland | Swati |
| Sweden | Swedish |
| Switzerland | French |
| Switzerland | German |
| Syria | Arabic |
| Taiwan | Traditional Chinese |
| Tajikistan | Tajik |
| Tanzania | Swahili |
| Thailand | Thai |
| Togo | French |
| Tokelau | English |
| Tonga | Tonga |
| Trinidad and Tobago | English |

TABLE 2-continued

EXAMPLE REGION-TO-LANGUAGE MAPPINGS

| REGION | LANGUAGE |
|---|---|
| Tunisia | Arabic |
| Turkey | Turkish |
| Turkmenistan | Turkmen |
| Turks and Caicos Islands | English |
| Tuvalu | English |
| U.S. Virgin Islands | English |
| US Minor Outlying Islands | English |
| USA | English |
| Uganda | Ganda |
| Ukraine | Ukrainian |
| United Arab Emirates | Arabic |
| United Kingdom | English |
| Uruguay | Spanish |
| Uzbekistan | Uzbek |
| Vanuatu | Bislama |
| Vatican State | Italian |
| Venezuela | Spanish |
| VietNam | Vietnamese |
| Wallis and Futuna | French |
| Yemen | Arabic |
| Yugoslavia | Serbo-Croatian |
| Zambia | English |
| Zimbabwe | English |

In block 130, the computer-implemented process determines the language of the input text to be the default language that is mapped to the user's region (determined in block 106) in the stored set of mappings between regions and languages. For example, if the user's region is "Austria," and if "Austria" is mapped to the "German" language, then the language of the input text is determined to be "German." After determining the language of the input text, the web site may provide the user with documents (e.g., web pages) that are written in the user's determined language.

Alternatively, in block 132, the computer-implemented process determines the language of the input text to be the language that is mapped to the service provider's market (determined in block 104) in a stored set of mappings between markets and languages. For example, if the service provider's market is "United States," and if the "Unites States" market is mapped to the "English" language, then the language of the input text is determined to be "English." After determining the language of the input text, the web site may provide the user with documents (e.g., web pages) that are written in the user's determined language. TABLE 1 above shows an example of possible mappings between market codes and languages that are spoken in the markets to which those market codes correspond.

Alternatively, in block 134, the computer-implemented process determines whether the service provider's market is located in a group of markets that are known to be in East Asia. In one embodiment of the invention, if the top-level domain of the URL discussed above in connection with block 104 is any of "cn" (China), "tw" (Taiwan), "jp" (Japan), "kr" (Korea), or "hk" (Hong Kong), then the service provider's market is identified as being in the "East Asia" group of markets. If the service provider's market is in the "East Asia" group of markets, then control passes to block 136. Otherwise, control passes to block 138.

In block 136, the computer-implemented process determines the language of the input text to be the language that is mapped to the service provider's market (determined in block 104) in a stored set of mappings between markets and languages. For example, if the service provider's market is "Japan," and if the "Japan" market is mapped to the "Japanese" language, then the language of the input text is determined to be "Japanese." After determining the language of the input text, the web site may provide the user with documents (e.g., web pages) that are written in the user's determined language. TABLE 1 above shows an example of possible mappings between market codes and languages that are spoken in the markets to which those market codes correspond.

As is discussed above, in one embodiment of the invention, the stored list of markets discussed above in connection with block 104 additionally specifies mappings between markets and specified threshold values for those markets. Each market may be mapped to a different threshold value. In block 138, the computer-implemented process determines whether the one of the following statements is true: (a) the confidence score (determined in block 108) surpasses a market threshold value that is mapped to the service provider's market (determined in block 104), or (b) both of the following sub-statements is true: (i) the script value (determined in block 108) does not indicate the "Latin" script and (ii) the language value (determined in block 108) surpasses a general (non-market-specific) specified threshold. If either of these statements (a) or (b) is true, then control passes to block 140. Otherwise, control passes back to block 128.

In block 140, the computer-implemented process determines the language of the input text to be the language that is indicated by the language value (determined in block 108 using statistical textual analysis of the user input). After determining the language of the input text, the web site may provide the user with documents (e.g., web pages) that are written in the user's determined language, as is discussed above in connection with block 114.

Similarly, in block 142, the computer-implemented process determines the language of the input text to be the language that is indicated by the language value (determined in block 108 using statistical textual analysis of the user input). After determining the language of the input text, the web site may provide the user with documents (e.g., web pages) that are written in the user's determined language, as is discussed above in connection with block 114.

Alternatively, in block 144, the computer-implemented process determines the user's language to be "English." After determining the user's language, the web site may provide the user with documents (e.g., web pages) that are written in the user's determined language, as is discussed above in connection with block 114.

Statistical Textual Analysis

As is discussed above with reference to block 108 of FIGS. 1A-D, in one embodiment of the invention, a computer-implemented process automatically determines a language value and a confidence score using automated statistical textual analysis. In one embodiment of the invention, an computer-implemented analyzer automatically performs this analysis by observing the frequencies of specified N-grams (character sequences of one character or more) in the user input to generate a "profile" of N-gram frequencies for the user input, and then comparing that user input profile to various other known language profiles to see which of the known language profiles the user input profile matches best (if any).

For example, an English language profile may be characterized by a high frequency of "th" and "er" N-grams in comparison to other N-grams, meaning that statistical analyses of documents in a document corpus have shown that documents known to be written in the English language tend to have higher frequencies of the "th" and "er" N-grams than documents written in other languages do. Thus, if the user input also has a high frequency of these particular N-grams, then the computer-implemented process may deduce that there is a high probability that the user input is written in English. The probability is captured in the confidence score.

In one embodiment of the invention, a computer-implemented process automatically computes the language value and confidence score discussed above in connection with block 108 of FIGS. 1A-D using techniques that are described in William B. Cavnar and John M. Trenkle, "N-Gram-Based Text Categorization," *In Proceedings of Third Annual Symposium on Document Analysis and Information Retrieval*, pages 161-175, Las Vegas, April 1994, the entire contents of which are incorporated by reference as though fully disclosed herein. Alternative techniques for determining the language value and confidence score for the user input may be used in alternative embodiments of the invention.

Example Language-Dependent Content Serving Applications

As is discussed above, after a computer-implemented process determines a language of the input text automatically using techniques described above, a content-providing entity may serve, to the user, content that is written in the determined language. There are several applications in which the techniques above may be used. For one example, an Internet search engine may determine the language of the input text based on the query term text that the user enters into a text entry field of the Internet search engine's web portal page. The Internet search engine may then present, to the user, query term-relevant search results that refer to web pages that are written in the determined language.

For another example, an e-mail client application may scan the text of an e-mail message (or just the header of that e-mail message) for words, and determine the language of the input text based on those words. The e-mail client application may then download (e.g., over the Internet) and present, to the user, advertisements that are relevant to the words and written in the determined language.

Hardware Overview

Figure 2:
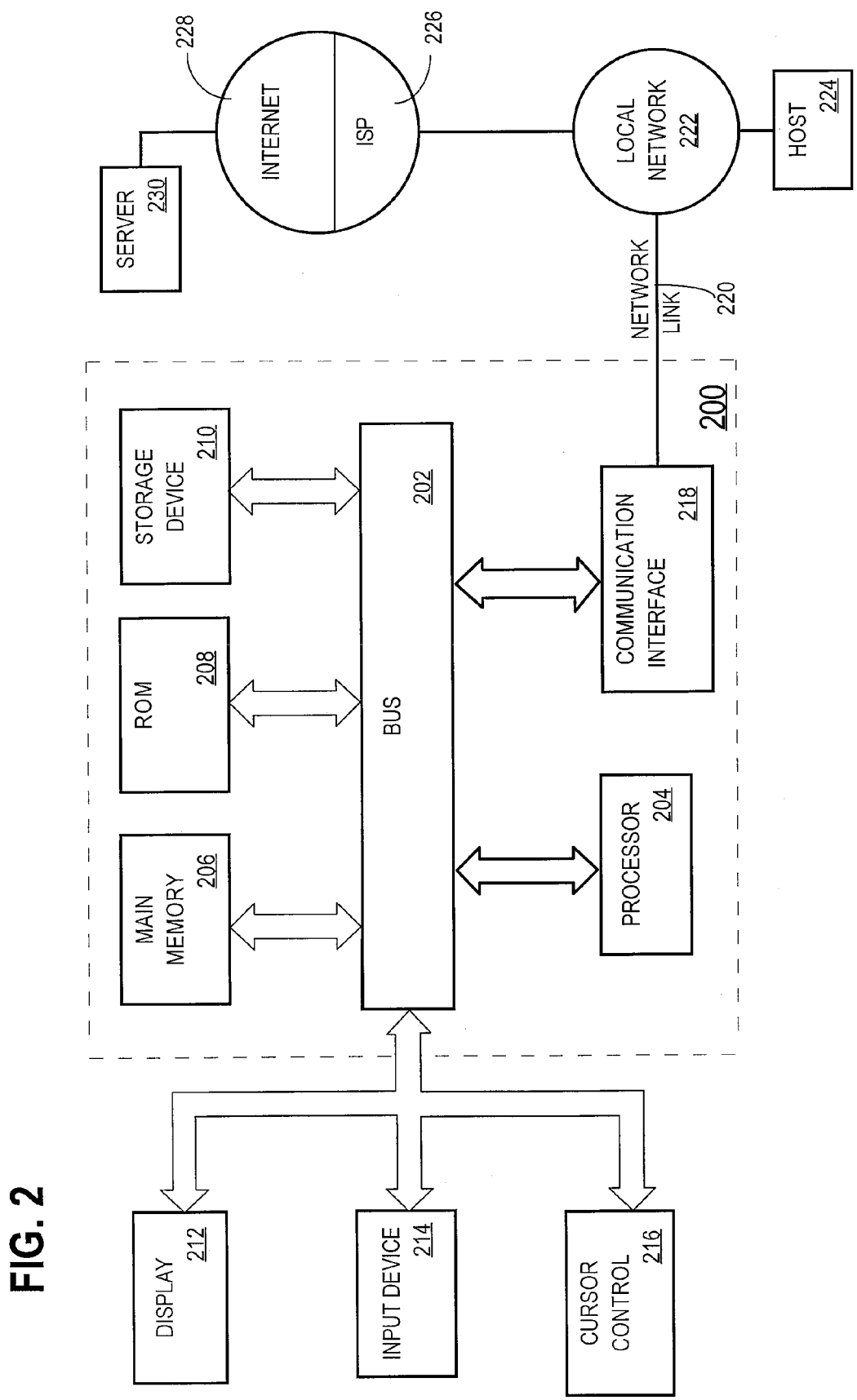
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   determining a particular language based at least in part on both content of text submitted by a user and a source IP address that is associated with the user; and
   based on having determined the particular language for the user, presenting, to the user, one or more content items that are associated with the particular language;
   wherein the content of the text does not expressly state the particular language.

2. The method of claim 1, wherein determining the particular language comprises:
   determining a particular market based on a top-level domain of a particular URL;
   determining whether the text is encoded in ASCII;

determining whether only one language is mapped to the particular market in a stored set of market-to-language mappings; and in response to determining that (a) the text is encoded in ASCII and (b) only one language is mapped to the particular market in the stored set of market-to-language mappings, determining that the particular language is the one language that is mapped to the particular market in the stored set of market-to-language mappings.

3. The method of claim 1, wherein determining the particular language comprises:

determining a particular market based on a top-level domain of a particular URL;

determining whether the text is encoded in ASCII;

determining whether only one language is mapped to the particular market in a stored set of market-to-language mappings;

determining whether the top-level domain is within a specified subset of top-level domains that consists only of "cn," "tw," "jp," "kr," and "hk"; and in response to determining that (a) the text is encoded in ASCII, (b) more than one language is mapped to the particular market in the stored set of market-to-language mappings, and (c) the top-level domain is within the specified subset of top-level domains, determining that the particular language is English.

4. The method of claim 1, wherein determining the particular language comprises:

determining a particular market based on a top-level domain of a particular URL;

determining whether the text is encoded in ASCII;

determining whether only one language is mapped to the particular market in a stored set of market-to-language mappings;

determining whether the top-level domain is within a specified subset of top-level domains that consists only of "cn," "tw," "jp," "kr," and "hk";

determining whether a confidence score, which reflects a level of confidence that a statistical textual analysis of the content of the text actually identified a language in which the content of the text is written, satisfies a particular threshold that is mapped to the particular market in a stored set of market-to-threshold mappings;

determining whether characters of the text are all within a Latin subset of Unicode; and in response to determining that (a) the text is encoded in ASCII, (b) more than one language is mapped to the particular market in the stored set of market-to-language mappings, (c) the top-level domain is not within the specified subset of top-level domains, (d) the confidence score satisfies the particular threshold, and (e) the characters of the text are all within a Latin subset of Unicode, determining that the particular language is a language identified by the statistical textual analysis.

5. The method of claim 1, wherein determining the particular language comprises:

determining a particular market based on a top-level domain of a particular URL;

determining whether the text is encoded in ASCII;

determining whether only one language is mapped to the particular market in a stored set of market-to-language mappings;

determining whether the top-level domain is within a specified subset of top-level domains that consists only of "cn," "tw," "jp," "kr," and "hk";

determining whether a confidence score, which reflects a level of confidence that a statistical textual analysis of the content of the text actually identified a language in which the content of the text is written, satisfies a particular threshold that is mapped to the particular market in a stored set of market-to-threshold mappings;

determining whether characters of the text are all within a Latin subset of Unicode;

determining a region based on the source IP address;

determining a region default language that is mapped to the country in a stored set of region-to-language mappings;

determining whether the region default language matches a language identified by the statistical textual analysis; and in response to determining that (a) the text is encoded in ASCII, (b) more than one language is mapped to the particular market in the stored set of market-to-language mappings, (c) the top-level domain is not within the specified subset of top-level domains, (d) the confidence score does not satisfy the particular threshold, (e) the characters of the text are all within a Latin subset of Unicode, and (f) the region default language matches the language identified by the statistical textual analysis, determining that the particular language is the language identified by the statistical textual analysis;

wherein the stored set of region-to-language mappings differs from the stored set of market-to-language mappings.

6. The method of claim 1, wherein determining the particular language comprises:

determining a particular market based on a top-level domain of a particular URL;

determining whether the text is encoded in ASCII;

determining whether only one language is mapped to the particular market in a stored set of market-to-language mappings;

determining whether the top-level domain is within a specified subset of top-level domains that consists only of "cn," "tw," "jp," "kr," and "hk";

determining whether a confidence score, which reflects a level of confidence that a statistical textual analysis of the content of the text actually identified a language in which the content of the text is written, satisfies a particular threshold that is mapped to the particular market in a stored set of market-to-threshold mappings;

determining whether characters of the text are all within a Latin subset of Unicode;

determining a region based on the source IP address;

determining a region default language that is mapped to the region in a stored set of region-to-language mappings;

determining whether the region default language matches a language identified by the statistical textual analysis; and in response to determining that (a) the text is encoded in ASCII, (b) more than one language is mapped to the particular market in the stored set of market-to-language mappings, (c) the top-level domain is not within the specified subset of top-level domains, (d) the confidence score does not satisfy the particular threshold, (e) the characters of the text are all within a Latin subset of Unicode, and (f) the region default language does not match the language identified by the statistical textual analysis, determining that the particular language is a market default language that is mapped to the particular market in the stored set of market-to-language mappings;

wherein the stored set of region-to-language mappings differs from the stored set of market-to-language mappings.

7. The method of claim 1, wherein determining the particular language comprises:
- determining a particular market based on a top-level domain of a particular URL;
- determining whether the text is encoded in ASCII;
- determining whether only one language is mapped to the particular market in a stored set of market-to-language mappings;
- determining whether the top-level domain is within a specified subset of top-level domains that consists only of "cn," "tw," "jp," "kr," and "hk";
- determining whether a confidence score, which reflects a level of confidence that a statistical textual analysis of the content of the text actually identified a language in which the content of the text is written, satisfies a particular threshold that is mapped to the particular market in a stored set of market-to-threshold mappings;
- determining whether characters of the text are all within a Latin subset of Unicode;
- in response to determining that (a) the text is encoded in ASCII, (b) more than one language is mapped to the particular market in the stored set of market-to-language mappings, (c) the top-level domain is not within the specified subset of top-level domains, (d) the confidence score does not satisfy the particular threshold, and (e) the characters of the text are not all within a Latin subset of Unicode, determining that the particular language is a market default language that is mapped to the particular market in the stored set of market-to-language mappings.

8. The method of claim 1, wherein determining the particular language comprises:
- determining a particular market based on a top-level domain of a particular URL;
- determining whether the text is encoded in ASCII;
- determining whether the top-level domain is within a specified subset of top-level domains that consists only of "cn," "tw," "jp," "kr," and "hk"; and
- in response to determining that (a) the text is not encoded in ASCII and (b) the top-level domain is within the specified subset of top-level domains, determining that the particular language is a market default language that is mapped to the particular market in the stored set of market-to-language mappings.

9. The method of claim 1, wherein determining the particular language comprises:
- determining a particular market based on a top-level domain of a particular URL;
- determining whether the text is encoded in ASCII;
- determining whether the top-level domain is within a specified subset of top-level domains that consists only of "cn," "tw," "jp," "kr," and "hk"; and
- determining whether a confidence score, which reflects a level of confidence that a statistical textual analysis of the content of the text actually identified a language in which the content of the text is written, satisfies a particular threshold that is mapped to the particular market in a stored set of market-to-threshold mappings;
- in response to determining that (a) the text is not encoded in ASCII, (b) the top-level domain is not within the specified subset of top-level domains, and (c) the confidence score satisfies the particular threshold, determining that the particular language is a language identified by the statistical textual analysis.

10. The method of claim 1, wherein determining the particular language comprises:
- determining a particular market based on a top-level domain of a particular URL;
- determining whether the text is encoded in ASCII;
- determining whether the top-level domain is within a specified subset of top-level domains that consists only of "cn," "tw," "jp," "kr," and "hk"; and
- determining whether characters of the text are all within a Latin subset of Unicode;
- determining whether a confidence score, which reflects a level of confidence that a statistical textual analysis of the content of the text actually identified a language in which the content of the text is written, satisfies a particular threshold; and
- in response to determining that (a) the text is not encoded in ASCII, (b) the top-level domain is not within the specified subset of top-level domains, (c) the confidence score satisfies the particular threshold, and (d) the characters of the text are not all within a Latin subset of Unicode, determining that the particular language is a language identified by the statistical textual analysis.

11. The computer-readable medium of claim 10, wherein the context of text includes search query terms submitted by the user to a search engine to search for documents related to the search query terms.

12. The method of claim 1, wherein the context of text includes search query terms submitted by the user to a search engine to search for documents related to the search query terms.

13. A volatile or non-volatile computer-readable storage medium storing one or more instructions which, when executed by one or more processors, cause the one or more processors to perform steps comprising:
- determining a particular language based at least in part on both content of text submitted by a user and a source IP address that is associated with the user; and
- based on having determined the particular language for the user, presenting, to the user, one or more content items that are associated with the particular language;
- wherein the content of the text does not expressly state the particular language.

14. The computer-readable medium of claim 13, wherein determining the particular language comprises:
- determining a particular market based on a top-level domain of a particular URL;
- determining whether the text is encoded in ASCII;
- determining whether only one language is mapped to the particular market in a stored set of market-to-language mappings; and
- in response to determining that (a) the text is encoded in ASCII and (b) only one language is mapped to the particular market in the stored set of market-to-language mappings, determining that the particular language is the one language that is mapped to the particular market in the stored set of market-to-language mappings.

15. The computer-readable medium of claim 13, wherein determining the particular language comprises:
- determining a particular market based on a top-level domain of a particular URL;
- determining whether the text is encoded in ASCII;
- determining whether only one language is mapped to the particular market in a stored set of market-to-language mappings;
- determining whether the top-level domain is within a specified subset of top-level domains that consists only of "cn," "tw," "jp," "kr," and "hk"; and in response to determining that (a) the text is encoded in ASCII, (b) more than one language is mapped to the particular market in the stored set of market-to-language mappings, and (c) the top-level domain is within the specified subset of top-level domains, determining that the particular language is English.

16. The computer-readable medium of claim 13, wherein determining the particular language comprises:
    determining a particular market based on a top-level domain of a particular URL;
    determining whether the text is encoded in ASCII;
    determining whether only one language is mapped to the particular market in a stored set of market-to-language mappings;
    determining whether the top-level domain is within a specified subset of top-level domains that consists only of "cn," "tw," "jp," "kr," and "hk";
    determining whether a confidence score, which reflects a level of confidence that a statistical textual analysis of the content of the text actually identified a language in which the content of the text is written, satisfies a particular threshold that is mapped to the particular market in a stored set of market-to-threshold mappings;
    determining whether characters of the text are all within a Latin subset of Unicode; and
    in response to determining that (a) the text is encoded in ASCII, (b) more than one language is mapped to the particular market in the stored set of market-to-language mappings, (c) the top-level domain is not within the specified subset of top-level domains, (d) the confidence score satisfies the particular threshold, and (e) the characters of the text are all within a Latin subset of Unicode, determining that the particular language is a language identified by the statistical textual analysis.

17. The computer-readable medium of claim 13, wherein determining the particular language comprises:
    determining a particular market based on a top-level domain of a particular URL;
    determining whether the text is encoded in ASCII;
    determining whether only one language is mapped to the particular market in a stored set of market-to-language mappings;
    determining whether the top-level domain is within a specified subset of top-level domains that consists only of "cn," "tw," "jp," "kr," and "hk";
    determining whether a confidence score, which reflects a level of confidence that a statistical textual analysis of the content of the text actually identified a language in which the content of the text is written, satisfies a particular threshold that is mapped to the particular market in a stored set of market-to-threshold mappings;
    determining whether characters of the text are all within a Latin subset of Unicode;
    determining a region based on the source IP address;
    determining a region default language that is mapped to the region in a stored set of region-to-language mappings;
    determining whether the region default language matches a language identified by the statistical textual analysis; and
    in response to determining that (a) the text is encoded in ASCII, (b) more than one language is mapped to the particular market in the stored set of market-to-language mappings, (c) the top-level domain is not within the specified subset of top-level domains, (d) the confidence score does not satisfy the particular threshold, (e) the characters of the text are all within a Latin subset of Unicode, and (f) the region default language matches the language identified by the statistical textual analysis, determining that the particular language is the language identified by the statistical textual analysis;
    wherein the stored set of region-to-language mappings differs from the stored set of market-to-language mappings.

18. The computer-readable medium of claim 13, wherein determining the particular language comprises:
    determining a particular market based on a top-level domain of a particular URL;
    determining whether the text is encoded in ASCII;
    determining whether only one language is mapped to the particular market in a stored set of market-to-language mappings;
    determining whether the top-level domain is within a specified subset of top-level domains that consists only of "cn," "tw," "jp," "kr," and "hk";
    determining whether a confidence score, which reflects a level of confidence that a statistical textual analysis of the content of the text actually identified a language in which the content of the text is written, satisfies a particular threshold that is mapped to the particular market in a stored set of market-to-threshold mappings;
    determining whether characters of the text are all within a Latin subset of Unicode;
    determining a region based on the source IP address;
    determining a region default language that is mapped to the region in a stored set of region-to-language mappings;
    determining whether the region default language matches a language identified by the statistical textual analysis; and
    in response to determining that (a) the text is encoded in ASCII, (b) more than one language is mapped to the particular market in the stored set of market-to-language mappings, (c) the top-level domain is not within the specified subset of top-level domains, (d) the confidence score does not satisfy the particular threshold, (e) the characters of the text are all within a Latin subset of Unicode, and (f) the region default language does not match the language identified by the statistical textual analysis, determining that the particular language is a market default language that is mapped to the particular market in the stored set of market-to-language mappings;
    wherein the stored set of region-to-language mappings differs from the stored set of market-to-language mappings.

19. The computer-readable medium of claim 13, wherein determining the particular language comprises:
    determining a particular market based on a top-level domain of a particular URL;
    determining whether the text is encoded in ASCII;
    determining whether only one language is mapped to the particular market in a stored set of market-to-language mappings;
    determining whether the top-level domain is within a specified subset of top-level domains that consists only of "cn," "tw," "jp," "kr," and "hk";
    determining whether a confidence score, which reflects a level of confidence that a statistical textual analysis of the content of the text actually identified a language in which the content of the text is written, satisfies a particular threshold that is mapped to the particular market in a stored set of market-to-threshold mappings;
    determining whether characters of the text are all within a Latin subset of Unicode;

in response to determining that (a) the text is encoded in ASCII, (b) more than one language is mapped to the particular market in the stored set of market-to-language mappings, (c) the top-level domain is not within the specified subset of top-level domains, (d) the confidence score does not satisfy the particular threshold, and (e) the characters of the text are not all within a Latin subset of Unicode, determining that the particular language is a market default language that is mapped to the particular market in the stored set of market-to-language mappings.

20. The computer-readable medium of claim 13, wherein determining the particular language comprises:
   determining a particular market based on a top-level domain of a particular URL;
   determining whether the text is encoded in ASCII;
   determining whether the top-level domain is within a specified subset of top-level domains that consists only of "cn," "tw," "jp," "kr," and "hk"; and
   in response to determining that (a) the text is not encoded in ASCII and (b) the top-level domain is within the specified subset of top-level domains, determining that the particular language is a market default language that is mapped to the particular market in the stored set of market-to-language mappings.

21. The computer-readable medium of claim 13, wherein determining the particular language comprises:
   determining a particular market based on a top-level domain of a particular URL;
   determining whether the text is encoded in ASCII;
   determining whether the top-level domain is within a specified subset of top-level domains that consists only of "cn," "tw," "jp," "kr," and "hk"; and
   determining whether a confidence score, which reflects a level of confidence that a statistical textual analysis of the content of the text actually identified a language in which the content of the text is written, satisfies a particular threshold that is mapped to the particular market in a stored set of market-to-threshold mappings;
   in response to determining that (a) the text is not encoded in ASCII, (b) the top-level domain is not within the specified subset of top-level domains, and (c) the confidence score satisfies the particular threshold, determining that the particular language is a language identified by the statistical textual analysis.

22. The computer-readable medium of claim 13, wherein determining the particular language comprises:
   determining a particular market based on a top-level domain of a particular URL;
   determining whether the text is encoded in ASCII;
   determining whether the top-level domain is within a specified subset of top-level domains that consists only of "cn," "tw," "jp," "kr," and "hk"; and
   determining whether characters of the text are all within a Latin subset of Unicode;
   determining whether a confidence score, which reflects a level of confidence that a statistical textual analysis of the content of the text actually identified a language in which the content of the text is written, satisfies a particular threshold; and
   in response to determining that (a) the text is not encoded in ASCII, (b) the top-level domain is not within the specified subset of top-level domains, (c) the confidence score satisfies the particular threshold, and (d) the characters of the text are not all within a Latin subset of Unicode, determining that the particular language is a language identified by the statistical textual analysis.

23. A computer-implemented method comprising:
   receiving one or more query terms of a query to a search engine that is capable of performing searches based on any one of a plurality of languages;
   selecting a particular language, from among the plurality of languages, based at least in part on both the one or more query terms of the query and at least one of: (a) whether the one or more query terms are encoded in ASCII, (b) a top-level domain of a particular URL, (c) a source IP address that is associated with a user entering the query, and (d) whether characters of the one or more query terms are in a specified subset of Unicode;
   based on having selected the particular language, performing a search for content items associated with the particular language based on the one or more query terms; and
   presenting, to the user, one or more content items that are associated with the particular language;
   wherein the content of the one or more query terms does not expressly state the particular language.

24. The method of claim 23, wherein the particular language is determined based on whether the one or more query terms are encoded in ASCII.

25. The method of claim 23, wherein the particular language is determined based on a top-level domain of a particular URL.

26. The method of claim 23, wherein the particular language is determined based on a source IP address that is associated with a user entering the query.

27. The method of claim 23, wherein the particular language is determined based on whether characters of the one or more query terms are in a specified subset of Unicode.

28. A volatile or non-volatile computer-readable storage medium storing one or more instructions which, when executed by one or more processors, cause the one or more processors to perform steps comprising:
   receiving one or more query terms of a query to a search engine that is capable of performing searches based on any one of a plurality of languages;
   selecting a particular language, from among the plurality of languages, based at least in part on both the one or more query terms of the query and at least one of: (a) whether the one or more query terms are encoded in ASCII, (b) a top-level domain of a particular URL, (c) a source IP address that is associated with a user entering the query, and (d) whether characters of the one or more query terms are in a specified subset of Unicode;
   based on having selected the particular language, performing a search for content items associated with the particular language based on the one or more query terms; and
   presenting, to the user, one or more content items that are associated with the particular language;
   wherein the content of the one or more query terms does not expressly state the particular language.

29. The computer-readable medium of claim 28, wherein the particular language is determined based on whether the one or more query terms are encoded in ASCII.

30. The computer-readable medium of claim 28, wherein the particular language is determined based on a top-level domain of a particular URL.

31. The computer-readable medium of claim 28, wherein the particular language is determined based on a source IP address that is associated with a user entering the query.

32. The computer-readable medium of claim 28, wherein the particular language is determined based on whether characters of the one or more query terms are in a specified subset of Unicode.

\* \* \* \* \*